United States Patent [19]

Fitzgibbon

[11] Patent Number: 5,477,651
[45] Date of Patent: Dec. 26, 1995

[54] VAPOR EXHAUST SYSTEM FOR USE IN BUILDING WALL CONSTRUCTION

[76] Inventor: Chester M. Fitzgibbon, 837 29th Ave. S., Seattle, Wash. 98144

[21] Appl. No.: 238,460

[22] Filed: May 5, 1994

[51] Int. Cl.⁶ .................................................... E04B 1/70
[52] U.S. Cl. ........................................ 52/302.1; 454/186
[58] Field of Search .................. 52/302.1, 220.2; 454/185, 186

[56] References Cited

U.S. PATENT DOCUMENTS

| | | | |
|---|---|---|---|
| 3,999,343 | 12/1976 | Roberts | 52/481.1 X |
| 4,235,054 | 11/1980 | Cable et al. | 52/481.1 X |
| 4,393,633 | 7/1983 | Charniga | 454/185 X |

Primary Examiner—Carl D. Friedman
Assistant Examiner—Creighton Smith
Attorney, Agent, or Firm—Jensen & Puntigam

[57] ABSTRACT

The vapor exhaust system is used in a wall section which includes a lower plate member (10) and an upper plate member (18), both of which have longitudinal grooves (12, 20) therein. Connected between the upper and lower plate members are a plurality of vertical stud members (26). Cut-out portions are provided in the stud members (26) as well as in the upper plate member (18), permitting air trapped between the studs to move out of the wall section through the cut-out portions. Exterior and interior facing members (54, 60) may be positioned on the wall sections. An opening (56) is provided in a lower portion of the exterior facing member (54). A pump (40) may be used to assist in the movement of air through the wall section.

14 Claims, 1 Drawing Sheet

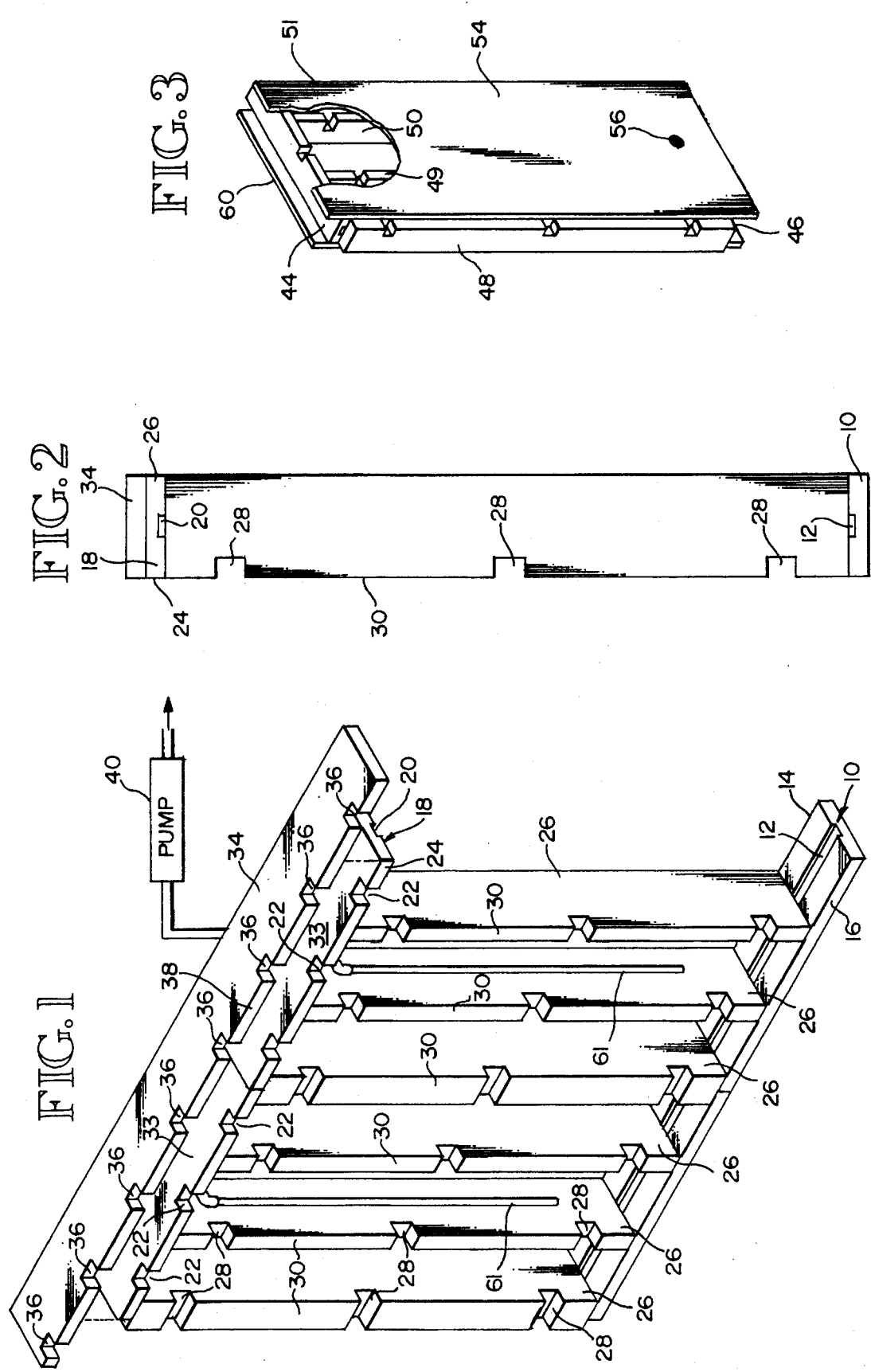

5,477,651

VAPOR EXHAUST SYSTEM FOR USE IN BUILDING WALL CONSTRUCTION

TECHNICAL FIELD

This invention relates generally to the construction of building walls for residences, apartments and office buildings, and more particularly concerns a vapor exhaust system which can be readily embodied in such building wall construction.

BACKGROUND OF THE INVENTION

Conventional building wall construction will typically include a plurality of vertical studs which are secured at spaced intervals to upper and lower horizontal bracing members, typically on 16-inch centers or other centerline distances as may be prescribed. The studs as well as the bracing members may be made from wood, composite materials, or even metal or combinations thereof. Interiorly, the vertical studs are covered by sheetrock, plaster, wood boards, or other interior material, while exteriorly, facing materials, such as wood boards, shingles, stone and/or brick or various combinations thereof, are typically used.

The finished wall construction creates trapped volumes of air between adjacent studs. These trapped volumes of air have some possible negative effects, including a tendency to maintain high interior temperatures on extremely warm days after the outside ambient temperature has gone down. In addition, certain harmful gases from the environment such as radon may become concentrated within the trapped air volumes and then seep out into the interior of the building.

Hence, it is desirable to have a wall construction which would permit movement of the trapped air out of the walls, including a path of air circulation.

DISCLOSURE OF THE INVENTION

Accordingly, the present invention includes an exhaust system for use in walls for buildings, including: at least one wall section which includes a lower plate member, an upper plate member and a plurality of stud members which extend therebetween, defining thereby a plurality of stud volumes between adjacent stud members, wherein the stud members include cut-out portions which permit vapors to move laterally across the section between the stud volumes and wherein the upper plate member includes cut-out portions which permit vapors to move from the stud volumes out of the wall section.

BRIEF DESCRIPTION OF THE DRAWINGS

FIG. 1 is a perspective view of a wall construction system using the vapor exhaust system of the present invention.

FIG. 2 is an end view of the system of FIG. 1.

FIG. 3 is a perspective view of one complete modular wall unit which incorporates the system of FIGS. 1 and 2.

BEST MODE FOR CARRYING OUT THE INVENTION

FIGS. 1 and 2 show a portion of a building wall construction, such as might be used in residences, in the form of adjacent modules which are secured together to form a complete wall. A more detailed explanation of a similar modular building system is set forth in U.S. Pat. No. 4,165,591, the contents of which are hereby incorporated by reference. It should be understood, however, that the present invention is not limited to modular-type construction, although it may be more readily manufactured and used in modules. Furthermore, it should be understood that the present invention may be used in various kinds of buildings, including residential, apartment houses and office buildings. Further, while the present invention may be most applicable to wood and composite building construction, it may also be useful with metal and/or other construction systems as well.

The wall construction system includes a bottom or sole plate 10 having a groove 12 which extends down the middle of the sole plate 10, intermediate of longitudinal edges 14 and 16. Groove 12 extends the entire length of plate 10. Sole plate 10 may have various dimensions, but as an example could be a 2×8 wood board. Typically, in modular construction the sole plate will be four feet long, although this length could vary. The groove 12 typically will be approximately one-inch wide and ½-inch deep, although this could vary. The sole plate could be a different width; e.g. 2×6 or 2×4, but then the other members in the wall system would typically have the same width.

An upper plate 18 is similar to sole plate 10 relative to its external dimensions and the presence of a longitudinal groove 20, intermediate of longitudinal edges 24, 26. The upper plate 18 also includes cut-out portions or notches 22 which extend inwardly of the upper plates from front longitudinal edge 24 thereof. In the embodiment shown, the cut-out portions 22 are spaced 16 inches apart and are rectangular, two inches long and one-half inch deep, although these dimensions could be varied.

Extending between and secured to sole plate 10 and upper plate 18, such as by nailing or the like, are a series of vertical stud members 26–26. The studs 26 in the embodiment shown are conventional dimensional lumber, approximately 8 feet long. Studs 26 are typically on 16-inch centers and are positioned such that they are midway between successive cut-out portions 22 in upper plate 18. Each vertical stud 26 also includes a plurality of cut-out portions or notches 28–28 which extend from a front edge 30 inwardly of the stud. In the embodiment shown, there are three cut-out portions in each stud, located at spaced intervals along the length thereof, where each cut-out portion is rectangular, approximately three inches long and one-half inch deep. The number of cut-out portions and the dimensions could be varied. Also, the cut-out portions could be positioned entirely between the longitudinal edges of the studs such as on or near a center line thereof.

In modular construction, one stud member, typically a 4×8, will bridge two adjacent upper plates and two adjacent sole plates, respectively, thereby connecting two adjacent modular units together. Intermediate of the end studs are several intermediate studs, which are usually 2×8s. Typically, but not necessarily, a single modular unit might comprise two center studs and two end studs, all on 16-inch centers, with the end studs bridging between the single module and adjacent modules on either side thereof. If the module used members with a 4-inch width, then the end studs would be 4×4s and the center studs would be 2×4s, as would the sole and upper plates.

Extending along the top surface 33 of the upper plates is a cover plate 34. Cover plates 34 are of random lengths, but typically are longer than two upper plates 18 (12 feet or more) and hence act as a connecting element between adjacent upper plates. Cover plate 34 has substantially the same dimensions as upper plates 18, except for the lack of a longitudinal groove. Cut-out sections 36—36 are located along the length of cover plate 34, extending inwardly from a front edge 38 thereof. These cut-out portions 36 are rectangular, two inches long by ½-inch deep, and are spaced apart the same distance as the cut-out portions 22 in upper plate 18; hence, cut-out portions 36 in cover plate 34 are in registry with cut-out portions 22, when the cover plate is properly positioned on the upper plates. Typically, cover plate 34 is secured to the upper plates 18—18 by nailing, screws, or similar means.

As can be seen from FIG. 1, the cut-out portions in the vertical stud members 26 are arranged to provide a means for vapors to move horizontally along the wall section so that vapors are not trapped in one particular volume between two adjacent stud members. The groove 12 in lower sole plate 10 and groove 20 in upper plate 18 also facilitate this horizontal movement of vapors between successive vertical volumes. Hence, the combination of the longitudinal grooves in the upper and lower plates and the cut-out portions in the vertical stud members result in a movement of vapors horizontally between the volumes defined by the vertical stud members.

The cut-out portions 22—22 in the upper plates and cut-out Portions 36—36 in cover plate 34 are designed to facilitate movement of the vapors up and out of the wall sections, into an attic or similar space. The movement of air through the various cut-out portions and the longitudinal grooves, ultimately out of the wall section, can be facilitated by a pump 40, although this is not necessary. The pump will maintain a steady flow of air from (and hence through) the wall section. This action is particularly helpful in the situation where hot air is present within the wall; movement of air through the interior of the wall section by the pump can produce a cooling effect for the interior of the building, where cooler air is brought into the wall section and the hot air is removed.

FIG. 3 shows a completed module and/or wall section. It includes upper and lower plate elements 44 and 46 and four vertical stud members 48–51. This is similar to the construction shown and described in detail relative to FIGS. 1 and 2. FIG. 3, however, includes an exterior face sheet 54 which can be of various materials, including wood and/or composite materials. Exterior facing member 54 is secured to the front edges of upper and lower plate members and the stud members. The two exterior stud members 48, 51 extend somewhat beyond the vertical edges of the exterior facing member 54. The facing members of adjacent modules will abut together over the exterior stud members of the adjacent modules.

The exterior facing member 54 has an opening 56 near the bottom thereof. This hole can vary in size, but is typically about one inch in diameter. A screen element is typically fitted over the opening and serves to keep particles and other items, including small animals, out of the vent hole, while permitting fresh air from the atmosphere to move into the wall section. A pump can be used to move heated air into the wall section to assist in heating a building space in cooler weather. The openings will be present at various locations around the periphery of the house. On the inside surface of the module is the interior facing member 60. The interior facing member may be made of various materials, including sheetrock or interior wood boards, for instance. The finished module could include a conduit 61, typically affixed to one of the studs in the module, such as shown in FIG. 1, to accommodate electrical wiring or the like.

Hence, a wall module has been disclosed and claimed which features a vapor exhaust system which facilitates the movement of air between stud volumes as well as upwardly through the upper portion thereof and out of the wall volume. This invention can also be used in standard wall construction. The vapor exhaust system results in the evacuation of harmful vapors, such as radon, so that they will not seep out into the interior of the building, and also produces a cooling effect on hot days by moving the hot, trapped air out of the wall section, replacing it with cooler air from the atmosphere. Heated air can also be moved into the wall section on cooler days.

Although a preferred embodiment of the invention has been disclosed for illustration, it should be understood that various changes, modifications and substitutions may be incorporated in such embodiment without departing from the invention which is defined by the claims which follow:

What is claimed is:

1. A vapor exhaust system for use in walls for buildings, comprising:

at least one wall section which includes a lower plate member, an upper plate member and a plurality of stud members extending therebetween, defining stud volumes, wherein the stud members include cut-out portions which permit vapors to move between the stud volumes and wherein the upper plate member includes cut-out portions which permit vapors to move upwardly from the stud volumes out of the wall section; and a pump to assist in the movement of air through the wall section.

2. The system of claim 1, wherein the lower plate member includes a longitudinal groove in an upper surface thereof, defining an additional pathway for vapors to move between stud volumes.

3. The system of claim 1, wherein the cut-out portions in the vertical stud members and the upper plate member are at least one-half inch deep and two inches wide.

4. The system of claim 1, wherein the upper plate member includes a longitudinal groove in a lower surface thereof.

5. The system of claim 2, wherein the upper plate member includes a longitudinal groove in a lower surface thereof.

6. The system of claim 1, wherein the upper plate member, the lower plate member and the stud members are all the same width.

7. The system of claim 1, wherein the cut-out portions extend inwardly from a front edge of the stud members and a front edge of the upper plate member.

8. The system of claim 7, including at least three cut-out portions along the length of the stud members, and wherein the cut-out portions in the upper plate member are located between each successive pair of stud members.

9. The system of claim 1, including a cover plate member which is secured to an upper surface of the upper plate member, the cover plate member including a plurality of cut-out portions which are in registry with the cut-out portions in the upper plate member.

10. The system of claim 1, including interior and exterior facing members secured, respectively, to opposing front and rear edges of the lower plate member, the upper plate member and the vertical stud members, thereby defining a complete wall section, wherein the exterior facing member includes an opening near a bottom edge thereof, permitting air to enter therethrough to an interior portion of the wall section.

11. A vapor exhaust system for use in walls for buildings, comprising:

at least one wall section which includes a lower plate member, an upper plate member and a plurality of stud members extending therebetween, defining stud volumes, wherein the stud members include cut-out portions which permit vapors to move between the stud volumes and wherein the upper plate member includes cut-out portions which permit vapors to move upwardly from the stud volumes out of the wall sections, wherein the lower plate member includes a longitudinal groove in an upper surface thereof and the upper plate member includes a longitudinal groove in a lower surface thereof, the longitudinal grooves extending the full length of the plate members such that they define additional pathways for vapors to move between stud volumes, and wherein said cut-out portions extend inwardly from a front edge of the stud members and a front edge of the upper plate member.

12. The system of claim 11, wherein the cut-out portions in the vertical stud members and the upper plate member are at least one-half inch deep and two inches wide.

13. The system of claim 11, including a cover plate member which is secured to an upper surface of the upper plate member, the cover plate member including a plurality of cut-out portions which are in registry with the cut-out portions in the upper plate member, wherein the cover plate member connects at least two adjacent wall sections.

14. The system of claim 11, including interior and exterior facing members secured, respectively, to opposing front and rear edges of the lower plate member, the upper plate member and the vertical stud members, thereby defining a complete wall section, wherein the exterior facing member includes an opening near a bottom edge thereof, permitting air to enter therethrough to an interior portion of the wall section.

* * * * *